United States Patent [19]

Sauber

[11] 4,297,062
[45] Oct. 27, 1981

[54] CARGO SECURING APPARATUS

[76] Inventor: Charles J. Sauber, 10 N. Sauber Rd., Virgil, Ill. 60182

[21] Appl. No.: 121,373

[22] Filed: Feb. 14, 1980

[51] Int. Cl.³ ............................................. B62D 63/08
[52] U.S. Cl. ....................................................... 410/37
[58] Field of Search .................................... 410/36, 37

[56] References Cited

U.S. PATENT DOCUMENTS 1,123,509  1/1915  Forest .................................... 410/37
4,003,585  1/1977  Richards ............................... 410/37

Primary Examiner—Richard A. Bertsch
Attorney, Agent, or Firm—Leydig, Voit, Osann, Mayer & Holt, Ltd.

[57] ABSTRACT

A cargo securing apparatus that is pivotally mountable with respect to a cargo supporting structure and adapted to receive a looped end portion of a web or other type of securing strap that extends around the cargo with the opposite end of the strap resiliently or extendedly secured to the support structure. The securing apparatus includes a generally U-shaped body having a slotted opening and the body contains a shiftable wedge member about which the looped end of the web or strap passes through the slotted opening. A handle member extending from the body portion enables the securing apparatus to be pivoted over center such that with the action of the shiftable wedge, the web or strap is fixedly secured in any one of an infinite number of adjustable positions for firmly holding the cargo with respect to the support structure.

4 Claims, 4 Drawing Figures

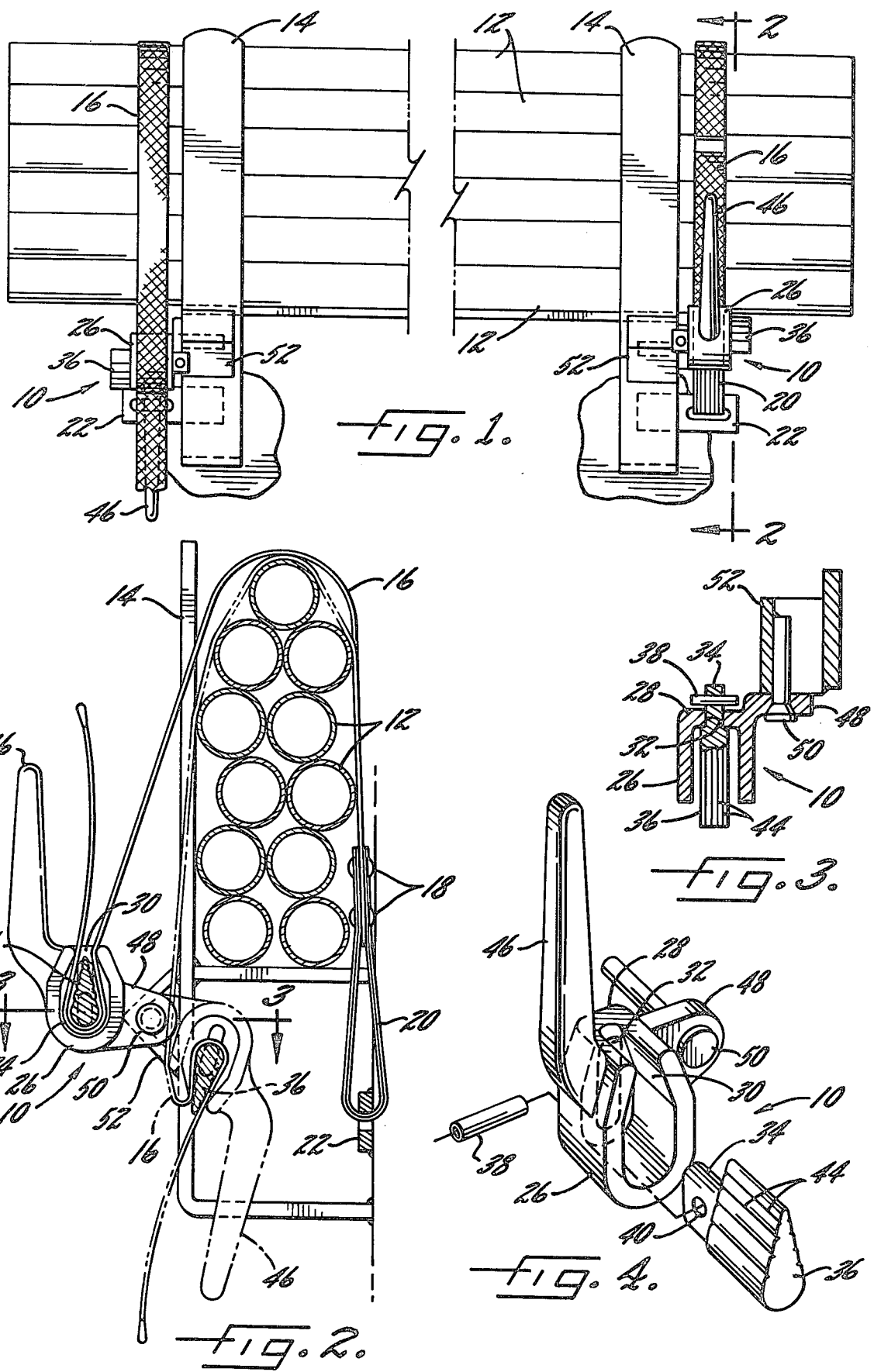

CARGO SECURING APPARATUS

DESCRIPTION OF THE INVENTION

The present invention relates generally to cargo securing apparatus and more particularly to a device for captively securing one end of a web or strap extending around the cargo with the other end of the strap attached to the cargo supporting structure such that the cargo is firmly held in place with respect to the supporting structure. In its principal aspects the present invention is concerned with improved cargo securing apparatus which receives a looped end of a web or strap extending around the cargo with its other end connected to the supporting structure and permits easy attachment, securement and infinite adjustment of the strap to firmly hold a cargo such as when transporting the same, yet accommodating for variations in sizes and quantities of the cargo sought to be held. While not so limited in its application, the cargo may conveniently be in the form of elongated cylinders such as pipe or conduit that may be transported by being held in spaced brackets fixed to a truck or the like.

Various arrangements have heretofore been used for securing a cargo such as pipe being transported and contained in a supporting structure. In general, such arrangements have been from simple tying of cords or belts and the like to the use of many different types of fasteners and buckle arrangements.

While any of such prior arrangements or devices will perform the function of securing a cargo, certain deficiencies or drawbacks are typically encountered which the present invention has now virtually eliminated. First, with simple tying it is difficult to gain sufficient leverage to draw the cord or belt tight enough about the cargo and even if it is felt to be tight enough, shifting such as through vibration may occur and the cord becomes loosened. On the other hand, if the tying is done too securely it may be difficult to untie or release. Similarly, fasteners and buckle arrangements which employ frictional holding only pose like problems with respect to obtaining sufficient leverage to tighten securely and if it can be accomplished releasing may be difficult. To avoid such problems more complex and costly mechanisms may be required. Second, positive fasteners and buckle arrangements normally require definite positions which limit the adjustability to accommodate variations in quantities and size of cargo such as where some of the items may be removed or additional ones added to the supporting structure.

Accordingly, it is a general aim of the present invention to overcome the foregoing disadvantages by providing an improved cargo securing apparatus which can be easily and positively operated to firmly secure a web or strap extending around the cargo while permitting an infinite amount of adjustment to accommodate variations in size and quantities of the cargo sought to be held.

It is another object of the invention to provide an improved cargo supporting apparatus which is characterized by its simplicity, ease of operation, reliability in use and relatively low in cost of production while being capable of mass-production.

More specifically it is an aim of the present invention to provide a novel cargo securing apparatus wherein a strap or web extending around the cargo may be readily and easily attached and firmly secured by a positive and simple pivoting manipulation which provides sufficient leverage to draw the web or strap tightly about a cargo and enabling release with the same ease and convenience.

Other objects and advantages of the invention will become apparent upon reading the following detailed description and upon reference to the drawings, in which:

FIG. 1 is a vertical elevation view of a cargo securing apparatus embodying the present invention here shown mounted with respect to a typical load of pipe carried by support structures with one such securing apparatus as viewed on the right being in the secured position and another is viewed on the left being in the released position.

FIG. 2 is an enlarged cross section taken along line 2—2 of FIG. 1 showing the cargo securing apparatus as it is readied for securement of a strap extending about a load of pipe carried by the support structure and with the engaged, fixed position of the securing apparatus being shown in phantom;

FIG. 3 is a section taken along the line 3—3 in FIG. 2, but with the strap means being removed; and FIG. 4 is an enlarged exploded, perspective showing the structure of the cargo securing device.

While the invention is susceptible of various modifications and alternate constructions, an illustrative embodiment thereof has been shown in the drawings and will be described below in detail. It should be understood, however, that there is no intention to limit the invention to the specific form disclosed, but, on the contrary, the intention is to cover all modifications, alternative constructions, and equivalents falling within the spirit and scope of the appended claims.

DESCRIPTION OF THE PREFERRED EMBODIMENT

Turning now to the drawings, FIGS. 1 and 2 illustrate cargo securing apparatus of the present invention, generally indicated 10, which in the present instance is for a load of pipe or conduit 12 carried by typical support brackets 14. The support brackets 14 as illustrated are like those which would be welded, steel, fabricated items affixed to truck bodies and the like (not shown). Thus, although the cargo securing apparatus is to be described as herein illustrated, in conjunction with application to securing pipes or conduits 12 as may be supported in the manner shown, those skilled in the art will appreciate that it is not limited thereto. On the contrary, it will be seen as the discussion proceeds that a cargo securing apparatus of the present invention may be effectively utilized without limitation to the specific illustrative cargo or to the particular vertical disposition as illustrated.

In order to physically hold the pipe 12, a web or strap means 16 made of a suitable natural or synthetic material such, for example, as canvas, nylon or other plastic is provided. As here shown, one end of the strap means is secured by rivets 18 or the like to a resilient or elastic looped member 20 which in turn is looped through a slotted member 22 fixed to the support structure. The arrangement is such that the strap means 16 may be extendably or resiliently stretched around the pipe load 12. It will be appreciated, of course, that instead of providing a resilient coupling like member 20, the strap means 16 itself may be resilient or extendably constructed.

In carrying out the present invention, as best shown in FIG. 2, the cargo securing device 10 is adapted to receive a looped end portion such as at 24 of strap means 16 after the latter has been positioned to surround the pipe load carried by the bracket 14. In accordance with the invention, the securing device 10 comprises a generally U-shaped body 26 which is open adjacent one side, has a closed wall 28 adjacent the opposite side and presents a slotted opening 30 at the top as viewed in FIGS. 2 and 4. The closed wall portion 28 has an elongated slot 32 formed therein which is adapted to receive a protruding, reduced portion 34 of a wedge shaped member 36. The wedge shaped member 36 is captively mounted in the body 10 by means of a pin 38 passing through an opening 40 provided in the protruding portion 34. Thus, when assembled the wedge shaped member 36 is shiftable longitudinally within the body 10 toward and away from the slotted opening 30.

In order to enable the looped portion 24 of strap means 16 to be easily placed around the wedge member 36, the wedge member 36 is made somewhat wider than and protrudes out from the open side of the body 10 as best shown in FIG. 3 at 42. For the purpose of enhancing the frictional gripping of the wedge member 36, a ribbed surface 44 is formed therein. However, it will be appreciated that instead of the illustrative ribbing other knurling or texturing of the surface for frictional gripping may be utilized.

In order to manually manipulate the securing device with sufficient desired leverage, there is provided an elongated handle 46 in this case integrally formed and protruding upwardly from the outer wall of the body 10. The opposite wall of the body 10 has a protruding ear 48 which receives a pin or other type of fastener 50 arranged to be fixedly secured by a mounting structure 52 in this instance to the support bracket 14. This arrangement permits the securing device body 10 by means of the handle 46 to be pivoted about the axis of pin 50.

In order to understand the ease and effectiveness of securement by the present apparatus, reference is made to FIG. 2 where the securing device 10 is shown with the strap means extending about the pipe load 12 and a looped end portion passing through the slotted opening 30 about the wedge member 36 in readiness for the securement operation. Upon rotation of the handle 46, the wedge member 36 moves toward the opening 30 binding on the strap means and the latter is pulled to wrap tightly about the pipe load stretching the resilient looped portion 20. As rotation of the handle continues about the pivot axis 50 tightening continues until the handle 46 and body 26 are moved over center with respect to the axis 50 as shown in phantom in FIG. 2. At this stage, the strap means 16 is held tightly against the body 26 and the wedge member 36 is firmly drawn into the slotted opening to also bind securely against the strap means 16. The over center position of the securing apparatus is self holding which precludes movement toward the release direction since the forces directed along the strap means now tend to pull the body 26 upwardly and away from the direction of release rotation.

When it is desired to release the securing apparatus, the handle 46 is positively rotated in the opposite direction back over center until the tension on strap 16 is released. Then, the wedge 36 may be shifted inwardly from the binding position in the slotted opening 30 and the looped portion of the strap means can be disengaged.

It will be understood that there has herein been described and illustrated a novel securing apparatus which can be made of molded parts few in number, either metal or plastic, and with wide variations in sizes for accommodating a variety of different types of loads. The strap means is infinitely adjustable to accommodate different cargo sizes and changes in quantities. Also, there is sufficient leverage provided to pull the strap means tightly about the cargo for firm and secure containment.

I claim as my invention:

1. A securing apparatus for use with extendable strap means having one of its ends fixed to a support structure and positionable about a cargo to be held, comprising, a generally U-shaped body adapted to be pivotally mounted for rotation about a fixed axis with respect to the support structure, said body defining an opening to receive a looped portion of the free end of said strap means, a shiftable wedge member captively mounted within the body for movement toward and away from said opening to frictionally bind the strap means with respect to said body, and handle means projecting from said body to pivotally rotate said body about said axis so that said strap means when looped about the wedge member through the body opening is pulled tightly to force said wedge member into binding position within said body opening.

2. A securing apparatus as claimed in claim 1 wherein said wedge member is wider than the body and protrudes outwardly therefrom so that a looped portion of the free end of said strap means may be easily positioned about the wedge member within said body.

3. A securing apparatus as claimed in claim 1 wherein said strap means includes a resilient connection for stretching said strap means tightly about the cargo upon pivotal rotation of said body with said handle.

4. A securing apparatus as claimed in claim 1 wherein said pivotal rotation of said handle positions said body over center with respect to the position of engagement between said looped end of said strap means and said body.

* * * * *